United States Patent Office 3,549,522
Patented Dec. 22, 1970

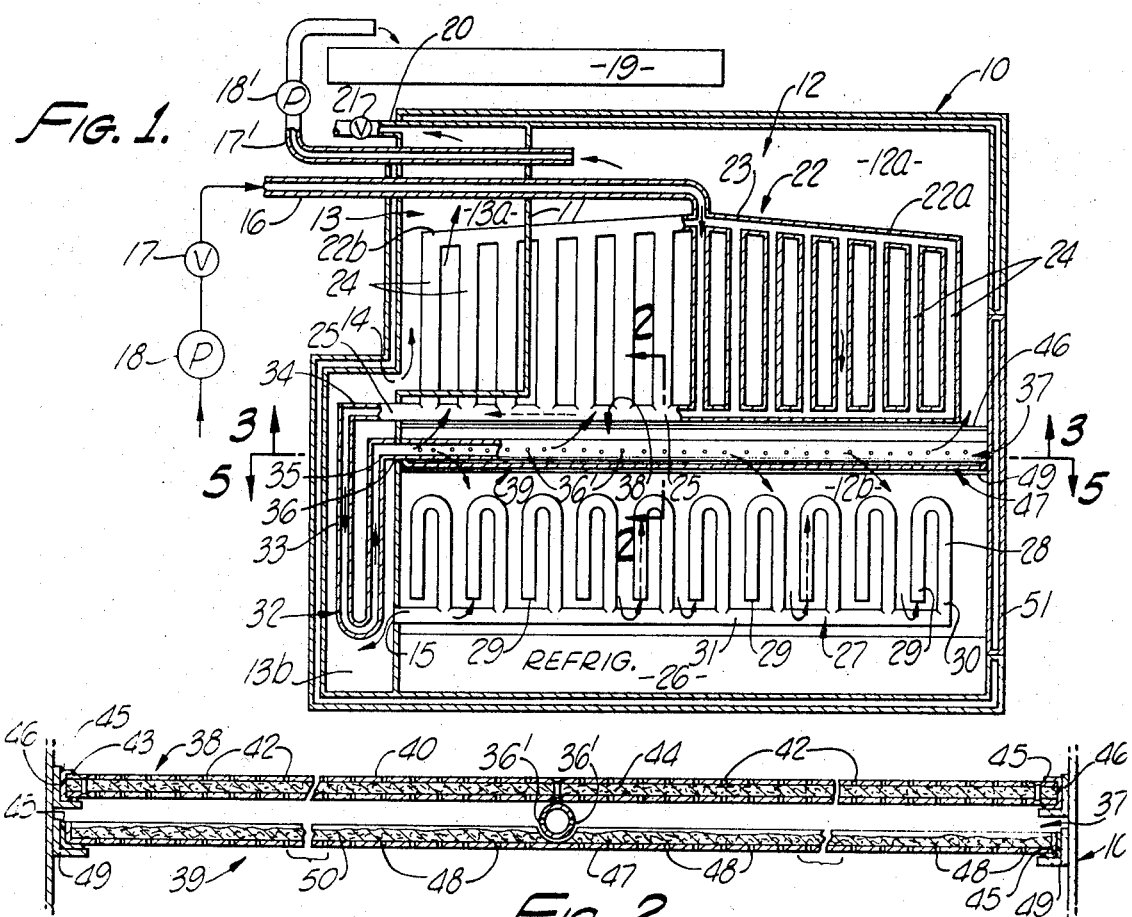

3,549,522
APPARATUS AND PROCESS FOR OBTAINING POTABLE WATER FROM SALINE SOLUTIONS
Ralph A. Nye and Dorothy M. Nye, both of 5425 Ash St., Los Angeles, Calif. 90042
Continuation-in-part of application Ser. No. 673,729, Oct. 9, 1967, which is a continuation-in-part of application Ser. No. 498,513, Oct. 21, 1965. This application Sept. 17, 1969, Ser. No. 858,777
Int. Cl. B01d 13/00
U.S. Cl. 210—23  12 Claims

ABSTRACT OF THE DISCLOSURE

Apparatus and method for obtaining potable water from saline and other solutions, wherein the solution enters at a relatively high temperature and is conducted through vertical heat exchange paths of series connected first and second heat exchangers where it is pre-cooled en route to horizontally extending treating means having an upper treating section through which water of low brine content passes through semi-permeable means containing hydrophilic and brine repelling substances to produce a potable water component, while being aided by the action of a closely underlying lower treating section containing brine-attracting hydrophobic substances operating to separate out the brine component of the solution.

CROSS-REFERENCE TO RELATED APPLICATIONS

The present application is a continuation-in-part of our copending application, Ser. No. 673,729, filed Oct. 9, 1967, now abandoned, and constituting a continuation-in-part of our abandoned application, Ser. No. 498,513, filed Oct. 21, 1965.

BACKGROUND OF THE INVENTION

The present invention relates to the separation of potable water from dilute saline solutions such as sea water.

Scientists and researchers, particularly in the present century, have become acutely aware of the increasing need for replacement of natural potable water supplies by means whereby non-potable water sources may be converted into potable water for meeting human needs. Accordingly, large sums of money are being appropriated and provided for research and development of apparatus and methods in this field, and many devices have heretofore been conceived and tested for the production of potable water, particularly from dilute solutions such as raw sea water. A few of the presently known methods may be mentioned, as follows:

(1) Reverse osmosis processes have been suggested. The difficulty attending the use of such processes resides in the fact that relatively high pressures of the order of 1500–2000 p.s.i., are required in the use of this process, the product flow is relatively restricted, and the costs of producing the potable water becomes excessive.

(2) Vaporization processes are not economically adapted for this purpose and are also, as a practical matter, uneconomical.

(3) As an improvement over the vaporizing process, pressure distillation has also been used for producing potable water from sea water.

(4) Freezing process is another known method of producing potable water from non-potable solutions, but here, again, this process is too costly for general use.

In the main, the methods heretofore utilized have necessitated the use of complicated apparatus and are not sufficiently economically operable to permit general use in the solution of the problem of economically producing potable water to meet the shortage as it now exists throughout the world, and particularly in arid regions.

Accordingly, the present invention provides a new concept which overcomes the problems inherent in the heretofore used methods and processes, and by the utilization of a three-stage semi-reversible, heat exchanging and refrigerating procedure takes advantage of operating characteristics which require relatively low operating energy, and permits the economical production of potable water, particularly from raw sea water or other dilute saline solutions. Basically the foregoing is accomplished in the present invention by initially subjecting the entering solution to super cooling temperatures to develop strong thermal diffusion forces in the solution, and then conducting the lighter components of the water upwardly through a reverse osmosis, semi-permeable treating section containing hydrophilic and brine-repelling substances, in increased volumes with the low pressures commensurable with the lowered osmotic forces in the solution, and is aided by catalytic forces, the force of gravity and thermal diffusion forces acting on the heavier, progressively colder brine as it separates from the solution. The brine solution is conducted through a treating section containing brine-attracting, hydrophobic substances which aid in the separation of the potable water from the solution. The heat exchanger paths and treating paths are further so oriented as to take full effect of the gravitational forces acting on the heavier brine of the solution and aid in the movement of the brine downwardly as the potable water is displaced upwardly, assisted by the catalytic actions of the substances contained in both of the treating sections. By the use of refrigerating means, the separated brine component of the solution is cooled and utilized for pre-cooling of the entering liquid and effecting temperature diffusion. By the combination embodying the above enumerated stages of the present invention, it is possible to efficiently and economically produce potable water from sea water and other dilute saline solutions.

SUMMARY OF THE INVENTION

The present invention relates to improvements in apparatus and method for separating a saline solution into potable water and brine components, and is more particularly concerned with a novel combination of liquid treating techniques so that they will coact in a manner such that potable water may be produced economically and continuously from sea water, and other dilute saline solutions.

Having in mind the previously noted problems and inherent lack of suitability of the presently known means and methods for separating potable water from saline solutions, it is one object of the herein described invention to provide means and process for such purpose which may be operated economically, and energy will be conserved rather than wasted.

Another object of the invention is to provide improved apparatus for such purpose, which is of simple construction and takes the form of a cellular or modular unit which may be repeated to provide units of greater capacity.

A further object is to provide means for utilizing electrolytical, catalytic substances for increasing the production of potable water and concentrated solutions of brine from dilute solutions, such as sea water, in an economical manner.

Still another object is to provide apparatus wherein the solution is subjected to the attracting and repelling characteristics of hydrophilic and hydrophobic substances in such a manner that the potable water will be forced in an upward direction, while the brine will be moved in a downward direction.

Still another object is to provide apparatus of the herein described character which will make use of gravitational forces, temperature differential forces, and reduced osmotic forces to economically produce potable water from a saline solution.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a vertical sectional view of a cell or module of apparatus embodying the features of the present invention, and more or less diagrammatically illustrating the cooperative association of the associated components of the system;

FIG. 2 is a fragmentary sectional view through the horizontally disposed treating mechanism, taken substantially on line 2—2 of FIG. 1;

FIG. 3 is a fragmentary sectional view of the same, taken substantially on line 3—3 of FIG. 1, and showing details of the upper treating section;

FIG. 4 is a side elevation of a treating unit as utilized in the upper treating section; and FIG. 5 is a fragmentary sectional view, taken substantially on line 5—5 of FIG. 1, and showing details of the treating unit as contained in the lower treating section.

DESCRIPTION OF THE PREFERRED EMBODIMENT

Referring more specifically to the drawings, for illustrative purposes, the invention is disclosed in FIG. 1 as comprising a cell or module which includes a housing structure 10 of substantially cubical configuration. It is to be understood that this cell or module may be combined with similar additional modules to increase the capacity of the apparatus. The housing is constructed of any suitable material, but preferably a material which will resist the action of the saline solution, and is shown as being of hollow wall construction which can be filled with suitable conventional insulating material, such as, for example, Styrofoam.

As will be seen, the housing is compartmented, in this case by partition means 11, to provide upright interior compartments as generally indicated at 12 and 13. The respective compartments are vertically separated into an upper and lower chamber in each case. Compartment 12 has an upper chamber 12a and a lower chamber 12b, while compartment 13 has an upper chamber 13a and lower chamber 13b, these chambers being interconnected through a communicating passage 14. The lower chambers 12b and 13b are in communication through an opening 15.

The solution which is to be treated is fed into the housing 10 through a supply pipe 16 which is connectible through a control valve 17 with the outlet side of a pump 18, the inlet side of this pump being connected with the source of saline solution. After being treated in the housing in the manner and by means subsequently to be described, the removable potable water accumulates at the top of chamber 12a, from whence it is conducted through a discharge pipe 17' under the action of a pump 18' and discharged into suitable storage or receiving container 19.

The brine concentrate is collected at the top of the upper chamber 13a from whence it may be conducted through an outflow pipe 20 under the control of a discharge valve 21 to a desired point of waste or use.

In the apparatus of the invention, heat exchangers are extensively utilized in order to augment the operation of separating the potable water from the saline solution. For such purpose, the supply pipe 16 is connected to a first heat exchanger positioned at the top of the housing, and is indicated generally by the numeral 22. In construction, the heat exchanger is conventional, the supply pipe 16 being connected to an upper header pipe 23 which is connected by means of a plurality of flow pipes 24 with a lower header 25, the outlet end of which, as indicated at 25', extends into the lower chamber 13b. It will be observed that the heat exchanger 22 has a greater portion of its extent, as indicated at 22a, positioned within the upper chamber 12a, while the lesser extent portion of the heat exchanger, as indicated at 22b, is positioned in the upper chamber 13a. The heat exchanger 22 therefore becomes effective with respect to and is in heat exchange relation with the reduced temperatures of the accumulated potable water and the brine, which has been cooled to a relatively low temperature by refrigerating means as generally indicated at 26 positioned in the bottom portion of the lower chamber 12b.

The refrigerator mechanism 26, which is of conventional construction, is utilized to cool the liquid brine within the lower chamber 12b to a relatively low temperature. This chamber also is provided with a heat exchanger as generally indicated at 27, and is shown as being constructed to provide a plurality of inverted U-shaped tubular elements 28 in which an end 29 thereof is open for the inflow of liquid from the chamber, the other end 30 of the element in each case being connected to a common header 31 having an outlet end connected into communication with the opening 15, so as to permit flow of liquid brine which has been cooled by the refrigerating means 26 into the lower chamber 13b.

A second heat exchanger 32 is positioned within the lower chamber 13b, this heat exchanger being constructed of one or more U-shaped elements 33 which are connected at one upper end 34 with the outlet end 25' of the heat exchanger 22, while the other end, as indicated at 35, is connected with a flow pipe 36 which horizontally traverses the compartment 12 and is operatively associated with water treating means 37 which divides the compartment 12 and separates the upper and lower chambers thereof. The flow pipe 36, as best shown in FIG. 2, extends between an upper treating section 38, and a lower treating section 39 of the treating means 37 which will now be described in detail.

The upper treating section 38 constitutes a reverse osmosis type, semi-permeable catalytic device which embodies a composite panel-like structure having a pair of spaced apart rigid sheets 40 and 41 which are similarly constructed of a suitable material such as stainless steel, which may have a thickness, for example, of 0.95 of an inch and may be, for example, one foot square. The sheets are shown as having perforations 42 permitting the flow of liquid therethrough. The sheets are secured together as by suitable rivets 43 with a hydrophylic composition of flour-like substances 44 sandwiched therebetween. These substances comprise such materials as oil shale, lignite coal, charcoal, coke, etc., which are used singly or in any combination with cellulose acetate, evaporated, heat treated and subjected to appropriate pressure so as to form a rigid-like plate structure of substantially .325 of an inch thick, and which may be bounded by a plastic edging as indicated at 45, FIG. 3. A preferred composition may comprise eight parts of De Beque Colorado shale, one part of lignite coal and one part of cellulose acetate, Eastman's, mixed thoroughly together, evaporated 24 hours at 90° F. and compacted under a high pressure in order of ten tons p.s.i. at 175° F. A plate structure as thus formed is supported at its opposite edges in suitable supporting slide members 46—46 within the housing in a position above the flow pipe 36, as shown in FIG. 2. The treating section thus described will operate to pass lighter water from the solution and reject brine when pressures greater than the osmotic pressure in the solution is exerted thereon. This is the principle of the well known process called reverse osmosis.

The lower treating section is constructed in the form of a shallow tray 47 having peripheral dimensions similar to the plate structure of the upper treating section as previously described above. The bottom of the tray is provided with perforations 48. The tray is arranged to be supported by slide members 49—49 similar to those previously described for the upper treating section. This tray may be constructed of any appropriate material such as aluminum, aluminum-copper alloy, glass, etc. The tray is used to loosely support therein appropriate hydrophobic materials such as water-repelling, brine-attracting zeolites, which may include vermiculite and sand, these materials being of appropriate size to prevent passage through the perforations of the tray. The porosity of the structure thus formed should be such that brine is not backed up into the separating area of the treating means. The hydrophobic materials are indicated at 50, FIG. 2.

As depicted in FIG. 2, the pipe 36 is arranged to feed the saline solution medially between the upper and lower treating sections. The pipe is preferably constructed of corrosion resisting material such as aluminum, aluminum-copper alloys, glass, etc., and is provided with side openings 36' for the delivery of the solution between the upper and lower treating sections. In a similar manner, the tray may be provided with a plastic edging 45 so that when the perforated members of the upper and lower treating sections are placed in the slide supports, the peripheries will be sealed relative to the housing. An access door 51 is provided in the housing wall permitting access to the housing interior for inspection, cleaning purposes, and removal and replacement of the plate and tray structures of the upper and lower treating sections, when required.

By utilizing the treating sections constructed as described above, the osmotic forces of the solution become considerably less than the gravitational forces acting on the heavier brine so that the force of gravity assisted by the forces of temperature differentials, and the catalytic action of the materials in the treating sections coact under the relatively low pressure of the solution to move the brine from the solution downwardly as the potable water is displaced and moved upwardly.

As exemplary of the operation of the apparatus, the saline solution, which may be raw sea water, is delivered from the pump 18 through the valve 17 to the supply pipe 16, preferably at a uniformly maintained temperature of approximately 60° F. and relatively low pressure of the order of 50 p.s.i. or less. The received solution is carried to the heat exchanger 22 where it may give up heat energy to the outgoing products sufficiently to reduce the temperature to the order of 30° F. which is delivered to the second heat exchanger 32 where the solution is cooled by brine having a temperature −10 to −20° F. Under the action of the relatively low entering pressure, assisted by the forces of gravity, and the downwardly acting temperature differentials, the solution is delivered to the treating means and discharged between the upper and lower treating sections thereof. The catalytic action of the substances contained in the upper and lower treating sections 38 and 39, both water-attracting and brine-repelling, coact to force water upwardly through the upper treating section and brine downwardly through the lower treating section into the lower chamber 12b where the brine is cooled by the refrigerating means 26 and delivered through the heat exchanger 27 and thence into the lower chamber 13b where it serves as a cooling medium for the solution passing through the heat exchanger 32 en route to the treating means. The brine continues upwardly through the passage 14 into the upper chamber 13a from whence it is discharged through the overflow pipe 20 under control of valve 21.

From the foregoing description and drawings, it will be clearly evident that the delineated objects and features of the invention will be accomplished.

Various modifications may suggest themselves to those skilled in the art without departing from the spirit of our invention, and, hence, we do not wish to be restricted to the specific form shown or uses mentioned.

We claim:
1. Apparatus for obtaining potable water from saline and other solutions, comprising:
   (a) a housing structure having its interior separated by partition means into upright adjacent liquid receiving compartments, each of said compartments having an upper chamber and a lower chamber therein, the upper chamber in each case having a top outlet connection for the chamber liquid, and the lower chambers having a bottom interconnection;
   (b) treating means between the upper and lower chambers of one of said compartments, said treating means having a liquid receiving inlet and liquid discharge outlets respectively into said associated upper and lower chambers;
   (c) heat exchanger means in at least one of said upper chambers for conducting a saline solution from a connected relatively high temperature source downwardly through the chamber to an outlet connection;
   (d) cooling means for reducing the temperature of the liquid in the bottom portions of said lower chambers;
   (e) means for conducting the saline solution from the outlet connection of the heat exchanger means to the inlet of the treating means through a flow path in which the solution will be cooled by said liquid having the reduced temperature; and
   (f) means for establishing a differential pressure on the liquid between the source connection and each said top outlet connection.

2. Apparatus according to claim 1, wherein said bottom interconnection includes a heat exchanger positioned in the lower chamber of said one of said compartments.

3. Apparatus according to claim 1, wherein the heat exchanger means has a portion also in the other of said upper chambers.

4. Apparatus according to claim 1, wherein said cooling means comprises refrigerating means at the bottom of the lower chamber operatively receiving liquid discharged from said treating means.

5. Apparatus according to claim 4, wherein the means for conducting the saline solution to the inlet of the treating means, comprises a second heat exchanger in the lower chamber of the other of said compartments.

6. Apparatus according to claim 5, wherein the second heat exchanger conducts the received saline solution through a downwardly extending path portion in said chamber and returns it to the inlet of the treating means in an upwardly extending path portion in said chamber.

7. Apparatus according to claim 1, wherein the treating means comprises upper and lower water treating sections.

8. Apparatus according to claim 7, wherein the upper treating section includes a composition of a hydrophilic material of the group including oil shale, lignite coal, coal, coke, and charcoal combined with cellulose acetate.

9. Apparatus according to claim 7, wherein the lower treating section includes a hydrophobic composition of ground materials including zeolite, vermiculite and sand.

10. Apparatus according to claim 7, wherein the treating sections are accessible through a door of the housing structure.

11. In apparatus for obtaining potable water from saline and other solutions:
   (a) horizontally disposed treating means including an upper treating section containing a porous composition having a hydrophilic material therein and a lower treating section containing a porous composition having a hydrophobic material therein;
   (b) means for supplying a saline solution to said treating means for discharge flow through said upper treating section and said lower treating section, said supplied solution having an initially relatively high temperature and a pressure substantially of 50 p.s.i.; and (c) means for pre-cooling said supplied solution prior to its entering said treating means.

12. The method of treating a saline solution to obtain potable water, which comprises the steps of:

(a) moving the solution downwardly in a substantially vertical path;

(b) pre-cooling the solution during said movement;

(c) delivering the pre-cooled solution into a horizontally disposed treating path; and (d) thereafter subjecting the solution, in said treating path to the coactive treating action of a hydrophilic substance and a hydrophobic substance to separate the potable water and brine constituents of the solution.

References Cited

UNITED STATES PATENTS 3,357,917  12/1967  Humphreys _____ 210—321X

FRANK A. SPEAR, JR., Primary Examiner

U.S. Cl. X.R.

210—24, 71, 181, 317, 321